US005224713A

United States Patent [19]
Pope

[11] Patent Number: 5,224,713
[45] Date of Patent: Jul. 6, 1993

[54] LABYRINTH SEAL WITH RECIRCULATING MEANS FOR REDUCING OR ELIMINATING PARASITIC LEAKAGE THROUGH THE SEAL

[75] Inventor: Adam N. Pope, Cincinnati, Ohio

[73] Assignee: General Electric Company, Cincinnati, Ohio

[21] Appl. No.: 751,384

[22] Filed: Aug. 28, 1991

[51] Int. Cl.⁵ .................................................. F16J 15/447
[52] U.S. Cl. .......................................... 277/3; 277/53; 415/173.5; 415/174.5
[58] Field of Search ................. 277/5, 53–57, 277/75; 415/173.4, 173.5, 173.6, 174.4, 174.5

[56] References Cited

U.S. PATENT DOCUMENTS

| | | | |
|---|---|---|---|
| 1,273,634 | 7/1918 | London | 277/158 |
| 2,963,268 | 12/1960 | Smile et al. | 277/53 X |
| 2,963,307 | 12/1960 | Bobo . | |
| 3,527,053 | 9/1970 | Horn | 415/174.4 X |
| 3,885,886 | 5/1975 | Richter | 415/173.4 X |
| 3,989,410 | 11/1976 | Ferrari | 415/173.7 X |
| 4,320,903 | 3/1982 | Ayache et al. | 277/53 X |
| 4,390,320 | 6/1983 | Eiswerth | 415/173.4 X |
| 4,466,239 | 8/1984 | Napoli et al. . | |
| 4,513,975 | 4/1985 | Hauser et al. . | |
| 4,534,701 | 8/1985 | Wisser | 415/173.6 X |
| 4,554,789 | 11/1985 | Napoli et al. . | |
| 4,662,821 | 5/1987 | Kervistin et al. | 415/174.5 |
| 5,012,640 | 5/1991 | Mirville | 415/173.6 X |
| 5,085,443 | 2/1992 | Richards | 277/53 |
| 5,088,889 | 2/1992 | Wolff | 277/53 X |
| 5,161,943 | 11/1992 | Maier et al. | 277/27 X |

FOREIGN PATENT DOCUMENTS

204375 12/1982 Japan ...................................... 277/53

Primary Examiner—William A. Cuchlinski, Jr.
Assistant Examiner—Scott W. Cummings
Attorney, Agent, or Firm—Jerome C. Squillaro; John R. Rafter

[57] ABSTRACT

A labyrinth seal for use in a gas turbine engine and placed between adjacently lying differently pressurized compartments where leakage may occur from the higher to the lower pressure compartment, the seal includes a stationary annular abradable shroud and a rotor with teeth and with channels formed between adjacent teeth, a pumping passage formed in the rotor for supplying an additional pressure component during rotation from the lower pressure compartment into the channel lying between the last pair of teeth downstream toward the lower pressure compartment.

8 Claims, 1 Drawing Sheet

LABYRINTH SEAL WITH RECIRCULATING MEANS FOR REDUCING OR ELIMINATING PARASITIC LEAKAGE THROUGH THE SEAL

FIELD OF THE INVENTION

The present invention relates to generally to improvements in gas turbine engines and, more particularly it relates to an improvement in labyrinth seals employed throughout the engine for restricting unwanted flow of gas or fluid between adjacent compartments within the engine.

BACKGROUND OF THE INVENTION

Practically all gas turbine engines utilize labyrinth seals throughout the engine to restrict or to prevent the flow of gas or fluids between adjacent internal compartments of the engine. Such labyrinth seal system is demonstrated by U.S. Pat. No. 3,989,410 issued Nov. 2, 1976 to Bartolomeo Joseph Ferrari of Topsfield, Mass., and assigned to the assignee of the present application, and is incorporated herein by reference. Such referenced patent in its single figure which is a partial cross-sectional view of a typical aircraft gas turbine engine illustrates several labyrinth seals in their practical applications where they are installed to control by throttling the gas or fluid flow between adjacent compartments through a series of annular constrictions formed by the radial clearance at the tips of their labyrinth teeth.

It is well known that there is a great deal of difficulty involved in the controlling of the magnitude of such radial clearances due to the large deflections imposed by thermal gradients, centrifugal and gas pressure forces, shaft flexing, etc. For these reasons, most of the applied designs of labyrinth seals permit excessive leakage of the gas or fluid between the adjacent compartments which they are intended to seal against leakage. Such undesirable leakage through the seals has a negative affect on engine efficiency, performance, fuel burn and also on turbine temperature. For example, when the labyrinth seals are used as gas buffers, to control leakage of lubrication from shaft bearing compartments, excessive leakage has the affect of raising oil heat load and increasing oil to fuel heat exchanger size and weight, because the heat from the normally hotter pressurizing air is absorbed by the lubricant. Weight and efficiency of lubrication compartment air-oil separator systems are also adversely affected, because of the requirement to handle greater volume flow rates of air.

There are many other applications where labyrinth seals are used as dynamic seals, such as pumps for handling toxic gases or gases otherwise harmful to the environment, or where expensive process gases have to be sealed. It is clearly obvious in all the above-mentioned exemplary application areas, that it is very important to limit or eliminate seal leakage rates.

OBJECTS AND SUMMARY OF THE INVENTION

It is, therefore, and object of the present invention to provide an improved sealing arrangement for use between two adjacent compartments of an apparatus by restricting or fully eliminating the leakage flow of the gas or fluid between such compartments.

It is another object of the present invention to provide an improved sealing arrangement for use between adjacent compartments of a gas turbine engine by restricting or eliminating the leakage flow of the gas or fluid between such compartments.

It is still another object of the present invention to provide an improved labyrinth seal apparatus for use between two adjacent compartments of an apparatus by restricting or fully eliminating the leakage flow of the gas or fluid through the seal between such compartments.

Yet another object of the present invention is to provide an improved labyrinth seal apparatus for use between two adjacent compartments of a gas turbine engine which is capable of restricting or fully eliminating the leakage flow of the gas or fluid through the labyrinth seal between such compartments.

Accordingly, the present invention provides a labyrinth seal apparatus including an abradable seal member, a toothed seal member, one of said seal members being arranged in a rotatable operating sealing arrangement with the other member, said toothed seal member having an input and an output side, each side being associated with a compartment having a media under different pressure therein, the media on the input side having a tendency to flow through the teeth clearances toward the compartment of the output side of the seal, adjacent teeth of the toothed seal member forming channel means therebetween, a passage means communicating the output compartment with one of the channel means lying close to the output side of the toothed member for providing an additional pressure component in the communicated channel means, thereby restricting or eliminating the tendency of the media from the input side to flow toward the output side.

Accordingly, the present invention in one aspect thereof provides for the use of the last-mentioned labyrinth seal arrangement in a gas turbine engine for providing sealing between predetermined adjacent compartments thereof and wherein the abradable seal member is a stationary member and the toothed seal member is a rotating member of the seal.

Accordingly, the present invention in another aspect thereof provides for the use of the last-mentioned labyrinth seal arrangement in an aircraft gas turbine engine, wherein the rotatable toothed seal member having formed the communicating passage between the output side compartment and the last downstream channel means thereof for supplying the additional pressure component to the channel means by the pumping action resulting from the rotation of the toothed member.

BRIEF DESCRIPTION OF THE DRAWINGS

The present invention will become more readily apparent from the following description of preferred embodiments thereof illustrated and described in reference to the accompanying drawings, in which.

DESCRIPTION OF THE PREFERRED EMBODIMENTS

Figure 1:
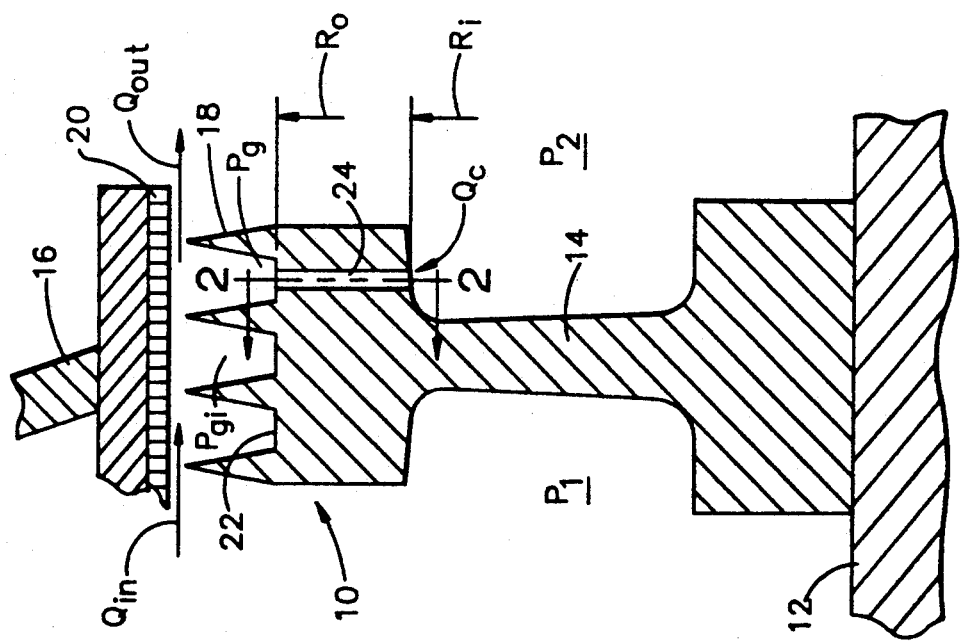
FIG. 1 is a sectional view of the labyrinth seal according to the present invention.

FIG. 1 illustrates in section the labyrinth seal 10 according to the present invention which includes an inner toothed rotating member 14 fixed for rotation to a main rotor 12 by bolts (not shown) or other suitable mounting means. The rotating member 14 is provided by a plurality of teeth 18 around its outer periphery and having channels 22 formed axially between adjacent teeth. The outer radii of the teeth are in close radial proximity to an abradable rub strip or shroud 20 fixed to the inner radius of an outer seal member 16 which can be either a stationary or rotating member. Without the benefit of the features provided by the present invention, the seal, in an operation which is examplarily described as within a gas turbine engine, will have a pressure P1 on its input side which is higher than the pressure P2 on its opposite or output side. In the absence of the inventive features hereinafter described, the pressure difference causes the gas to flow through the clearance between the teeth 18, (such clearance is shown, in a somewhat off-scale fashion, to be larger than in practice, for illustrative purposes), and the rub strip 20, from the higher to the lower pressure level. Under this conditions, the mass flow rate into the seal through the first tooth $Q_{in}$ is equal to the mass flow rate out $Q_{out}$ through the last tooth 18. The labyrinth seal 10 may contain any number of teeth 18 and the pressure level in each channel 22 formed between each teeth 18 is lower than in the next channel upstream in the direction of the flow, with the channel immediately upstream of the last tooth containing the minimum channel pressure Pg which is also at a higher level than P2. The larger the number of teeth 18, the lower the pressure drop across the last tooth. As pointed out above, up to this point the inventive features have not been considered in the pressure analysis of the seal, that is, the behavior described was that of a typical state of the art seal.

Figure 2:
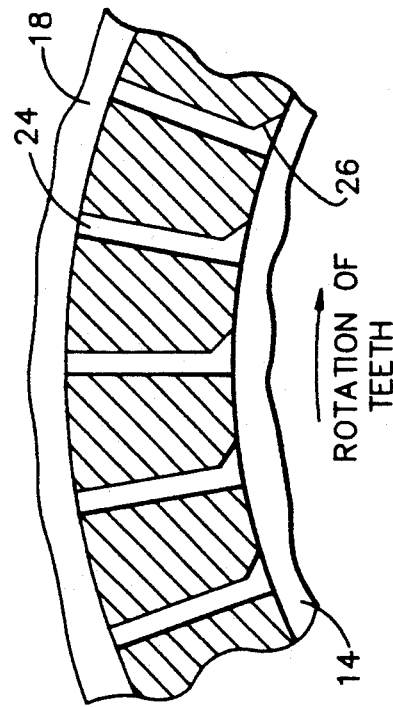
FIG. 2 is a sectional view of an embodiment taken along line 2—2 of FIG. 1, wherein the passages are directed radially.
Figure 3:
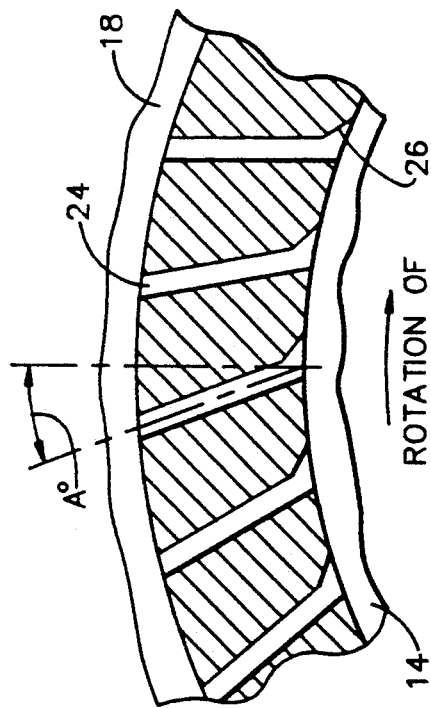
FIG. 3 is a sectional view of another embodiment taken along line 2—2 of FIG. 1, wherein the passages are directed at an angle with respect to the radial.

Now, according to the present invention, a plurality of passages 24 are formed in the rotating toothed member 14 over its entire circumference and are spaced uniformly thereover. The passages 24 in one embodiment shown in FIG. 2 are directed radially, while in the embodiment shown in FIG. 3 are directed slanted by an angle A with respect to a radius. The passages start at a radial distance Ri as shown, and terminate at a radial distance Ro at the bottom of the channel 22. The passages 24 preferably are formed exiting in the channel 22 between the last adjacent downstream teeth 18. The air entrained in these passages 24 must rotate at the same angular velocity as the rotating seal member 14 and, is therefore, subjected to a centrifugal force causing the air to move away from the center of rotation. The passages 24 in effect function as a pump and in order to further enhance the pumping effect, they are provided with a bevelled scooping recess 26 pointing in the direction of rotation. The pumping action forces the air to flow radially outward from the inner radius Ri to the outer radius Ro and into the channel 22 just upstream of the last tooth 18. The inlet pressure to the passages at Ri is substantially equal to the pressure P2 at the exit of the last tooth 18. Due to the angular velocity of the rotating member 14, the pumping action through the passages 24 will result in a net outward flow into the channel 22 at Ro. Since this increased flow must exit the seal through the last tooth 18 which is at a fixed flow clearance area, the pressure Pg in the gland 22 is forced to a higher level than it would be otherwise without the presence of the passages 24. As the pressure Pg is forced to increase, the pressure drop Pl-Pg must decrease and, provided that the pressure ratio Pg/Pgi across the tooth immediately upstream of the exit of the passages 24 is at or greater than the choked flow ratio (which is a condition where air is flowing at sonic velocity), the flow $Q_{in}$ into the seal must decrease. As a result the flow equilibrium under the inventive conditions is defined by the equation $Q_{in} = Q_{out} - Q_c$, where $Q_c$ = the mass flow rate of the air or gas pumped through the passages 24. With the inventive system the leakage flow rate of the sealed air or gas at P1 has been significantly decreased and potentially eliminated.

As has been shown, with the inventive structure, the substantial reduction or elimination of the leakage flow rate of the sealed medium results in improved engine performance and specific fuel consumption, in lower turbine inlet temperatures (longer bucket life) and in lighter weight as the result of the reduction of the flow rate of hot gases ingested into the lubrication system, thereby reducing the heat exchanger and air-oil separator requirement.

While there has been described herein what is considered to be preferred embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the appended claims.

I claim:

1. In a rotary seal apparatus including an abradable shroud member and a toothed seal member, a pressure activated labyrinth seal comprising: channel means formed between adjacent teeth of said toothed seal member, means for mounting said members into a sealing operational relationship with respect to each other for preventing leakage of a sealed pressurized fluid at a first pressure from one side of said toothed member to the other side of said toothed member being under a second and lesser pressure than said pressurized fluid, passage means formed through said toothed seal member for communicating the lesser pressure side with a predetermined channel means for supplying an additional pressure component into said channel means acting to inhibit leakage flow beyond said predetermined channel means toward said lesser pressure side of said toothed member, wherein said toothed seal member is rotary seal member, said passage means being formed so that it extends along a radius in said toothed seal member and including an input opening facing said lesser pressurized side and an output opening terminating in said channel means.

2. In a rotary seal apparatus including an abradable shroud member and a toothed seal member, a pressure activated labyrinth seal comprising: channel means formed between adjacent teeth of said toothed seal member, means for mounting said members into a sealing operational relationship with respect to each other for preventing leakage of a sealed pressurized fluid at a first pressure from one side of said toothed member to the other side of said toothed member being under a second and lesser pressure than said pressurized fluid, passage means formed through said toothed seal member for communicating the lesser pressure side with a predetermined channel means for supplying an additional pressure component into said channel means acting to inhibit leakage flow beyond said predetermined channel means toward said lesser pressure side of said toothed member, wherein said toothed seal member is a rotary seal member, said passage means being formed radially in said toothed seal member and including an input opening facing said lesser pressurized side and an output opening terminating in said channel means, wherein said input opening is formed as a scooping means for increasing a pumping action of said passage means during rotation of said toothed seal member.

3. In a rotary seal apparatus including an abradable shroud member and a toothed seal member, a pressure activated labyrinth seal comprising: channel means formed between adjacent teeth of said toothed seal member, means for mounting said members into a sealing operational relationship with respect to each other for preventing leakage of a sealed pressurized fluid at a first pressure from one side of said toothed member to the other side of said toothed member being under a second lesser pressure than said pressurized fluid, passage means formed through said toothed seal member for communicating the lesser pressure side with a predetermined channel means for supplying an additional pressure component into said channel means acting to inhibit leakage flow beyond said predetermined channel means toward said lesser pressure side of said toothed member, wherein said toothed seal member is a rotary seal member, said passage means being formed at an angle with respect to a radius in said toothed seal member and beyond said radius, and passage means including an input opening facing said lesser pressurized side and an output opening terminating in said channel means, wherein said input opening is forming as a scooping means for increasing a pumping action of said passage means during rotation of said toothed seal member.

4. In a rotary labyrinth seal apparatus for a gas turbine engine including an abradable shroud member an a toothed seal member, a pressure activated labyrinth seal comprising: channel means formed between adjacent teeth of said toothed seal member, means for mounting said members into a sealing operational relationship with respect to each other for preventing leakage of a pressurized fluid at a first pressure from a first compartment of said engine on one side of said toothed seal member to a second compartment of said engine at a second pressure on the other side of said toothed seal member, said first compartment being under a higher pressure than said second compartment, passage means formed so that it extends along a radius in said toothed sealed member for communicating said second compartment of said engine with a predetermined channel means and for pumping fluid from said second compartment of said engine to said predetermined channel means, thereby supplying an additional pressure component into said channel means acting to inhibit leakage flow beyond said predetermined channel means toward said compartment of said engine.

5. The combination as claimed in claim 4, wherein said abradable shroud member is a stationary member and said toothed seal member is a rotary member.

6. In a rotary labyrinth seal apparatus for a gas turbine engine including an abradable shroud member and a toothed seal member, a pressure activated labyrinth seal comprising: channel means formed between adjacent teeth of said toothed seal member, means for mounting said members into a sealing operational relationship with respect to each other for preventing leakage of a pressurized fluid from a first compartment of said engine on one side of said toothed seal member to a second compartment of said engine on the other side of said toothed seal member, said first compartment being under a higher pressure than said second compartment, passage means formed through said toothed seal member for communicating said second compartment of said engine with a predetermined channel means for supplying an additional pressure component into said channel means acting to inhibit leakage flow beyond said predetermined channel means toward said second compartment of said engine, wherein said toothed seal member is a rotary seal member, said passage means being formed so that it extends along a radius in said toothed seal member and including an input opening facing said second compartment of said engine and an output opening terminating in said channel means.

7. In a rotary labyrinth seal apparatus for a gas turbine engine including an abradable shroud member and a toothed seal member, a pressure activated labyrinth seal comprising: channel means formed between adjacent teeth of said toothed seal member, means for mounting said members into a sealing operational relationship with respect to each other for preventing leakage of a pressurized fluid from a first compartment of said engine on one side of said toothed seal member to a second compartment of said engine on the other side of said toothed seal member, said first compartment being under a higher pressure than said second compartment, passage means formed through said toothed seal member for communicating said second compartment of said engine with a predetermined channel means for supplying an additional pressure component into said channel means acting to inhibit leakage flow beyond said predetermined channel means toward said second compartment of said engine, wherein said toothed seal member is a rotary seal member, said passage means being formed radially in said toothed seal member and including an input opening facing said second compartment of said engine and an output opening terminating in said channel mean, wherein said input opening is formed as a scooping means for increasing a pumping action of said passage means during rotation of said toothed seal member.

8. In a rotary labyrinth seal apparatus for a gas turbine engine including an abradable shroud member and a toothed seal member, a pressure activated labyrinth seal comprising: channel means formed between adjacent teeth of said toothed seal member, means for mounting said members into a sealing operational relationship with respect to each other for preventing leakage of a pressurized fluid from a first compartment of said engine on one side of said toothed seal member to a second compartment of said engine on the other side of said toothed seal member, said first compartment being under a higher pressure than said second compartment, passage means formed through said toothed seal member for communicating said second compartment of said engine with a predetermined channel means for supplying an additional pressure component into said channel means acting to inhibit leakage flow beyond said predetermined channel means toward said second compartment of said engine, wherein said toothed seal member is a rotary seal member, said passage means being formed at an angle with respect to a radius in said toothed seal member and beyond said radius, said passage means including an input opening facing said second compartment of said engine and an output opening terminating in said channel means, wherein said input opening is formed as a scooping means for increasing a pumping action of said passage means during rotation of said toothed seal member.

* * * * *